US012104432B2

(12) United States Patent
Nelson et al.

(10) Patent No.: US 12,104,432 B2
(45) Date of Patent: Oct. 1, 2024

(54) CONFIGURABLE ASTRAGAL AND SNAP FEATURE FOR FENESTRATION SYSTEMS

(71) Applicant: JELD-WEN, Inc., Charlotte, NC (US)

(72) Inventors: Jacob Nelson, Klamath Falls, OR (US); Yoshua Gombo, Seattle, WA (US); David Belau, Klamath Falls, OR (US); Ryan Schroeder, Klamath Falls, OR (US); Jerry Jones, Klamath Falls, OR (US)

(73) Assignee: JELD-WEN, Inc., Charlotte, NC (US)

( * ) Notice: Subject to any disclaimer, the term of this patent is extended or adjusted under 35 U.S.C. 154(b) by 995 days.

(21) Appl. No.: 17/075,680

(22) Filed: Oct. 20, 2020

(65) Prior Publication Data

US 2021/0115725 A1 Apr. 22, 2021

Related U.S. Application Data

(60) Provisional application No. 63/024,275, filed on May 13, 2020, provisional application No. 62/924,098, filed on Oct. 21, 2019.

(51) Int. Cl.
*E06B 3/46* (2006.01)
*E05C 7/04* (2006.01)
*E06B 3/36* (2006.01)

(52) U.S. Cl.
CPC .............. *E06B 3/365* (2013.01); *E05C 7/045* (2013.01); *E06B 3/4618* (2013.01)

(58) Field of Classification Search
CPC .......... E06B 1/366; E06B 1/365; E06B 1/524; E06B 3/42; E06B 3/46; E06B 3/4609; E06B 3/4618; E06B 3/4636; E06B 3/5072; E06B 3/964; E06B 3/4407; E06B 3/4415; E06B 3/487; E06B 3/365; E06B 3/44
See application file for complete search history.

(56) References Cited

U.S. PATENT DOCUMENTS 4,114,317 A * 9/1978 Crawley ............... E05D 15/066 49/225
4,202,137 A * 5/1980 Randall ................. E06B 3/4609 49/458

(Continued)

OTHER PUBLICATIONS

Jeld-Wen Windows and Doors, How to Install the Astragal on a Premium Atlantic Vinyl Sliding Patio Door (www.https://www.youtube.com/watch?v=5GUShMUab9U), Video 0:00-2:32, Uploaded Oct. 14, 2015 (Year: 2015).*

*Primary Examiner* — Kyle J. Walraed-Sullivan
(74) *Attorney, Agent, or Firm* — Lorenz & Kopf LLP

(57) ABSTRACT

An astragal for a fenestration system includes at least first and second slots running along opposite sides of the astragal, each slot is configured to receive a stile of a panel of the fenestration system. The slots may be in different planes or in a common plane, and may be different depths or the same depth. In some embodiments, additional slots are provided in the astragal, on one or both sides of the astragal, and the astragal may be used in various placements and configurations within multi-panel door or window systems. A snap clip may be included within one or more of the slots to engage a stile when received in the slot and secure the panel to the astragal. Covers may fill slots that are not utilized in a particular panel configuration.

20 Claims, 17 Drawing Sheets

(56) References Cited

U.S. PATENT DOCUMENTS

| | | | | | |
|---|---|---|---|---|---|
| 4,924,628 | A * | 5/1990 | Ruby | E06B 3/4609 49/404 |
| D325,993 | S | 5/1992 | Valentin | |
| D327,331 | S | 6/1992 | Dallaire et al. | |
| D334,241 | S | 3/1993 | Cole | |
| D339,645 | S | 9/1993 | Cole | |
| D378,431 | S | 3/1997 | Dallaire | |
| D379,529 | S | 5/1997 | Digiorgio | |
| D382,655 | S | 8/1997 | Colitto | |
| D383,222 | S | 9/1997 | Dallaire et al. | |
| D384,170 | S | 9/1997 | Franson | |
| D386,266 | S | 11/1997 | Dallaire et al. | |
| D392,053 | S | 3/1998 | Dallaire et al. | |
| D394,510 | S | 5/1998 | Dallaire et al. | |
| D400,269 | S | 10/1998 | Franson | |
| D431,083 | S | 9/2000 | Franson | |
| D576,748 | S | 9/2008 | Schrader | |
| D602,174 | S | 10/2009 | Franson | |
| D691,740 | S | 10/2013 | Kosonen | |
| D714,468 | S | 9/2014 | Fannan | |
| D855,219 | S | 7/2019 | Kosonen | |
| D917,076 | S | 4/2021 | Nelson et al. | |
| 2002/0032995 | A1* | 3/2002 | Siudzinski | E06B 1/524 49/366 |
| 2005/0144861 | A1* | 7/2005 | Petta | E06B 3/5409 52/204.1 |
| 2006/0059780 | A1* | 3/2006 | Petta | E06B 3/44 49/163 |
| 2008/0216424 | A1* | 9/2008 | Westphal | E06B 1/6007 52/204.5 |
| 2010/0192468 | A1* | 8/2010 | Chubb | E06B 7/2312 49/404 |
| 2011/0154753 | A1 | 6/2011 | Furgerson et al. | |
| 2015/0233169 | A1* | 8/2015 | Saunders | E06B 1/6007 52/204.7 |
| 2019/0145155 | A1* | 5/2019 | Minelli | E06B 3/26347 49/449 |
| 2020/0109593 | A1 | 4/2020 | Kunkel | |
| 2021/0404241 | A1* | 12/2021 | Hay, III | E06B 3/365 |

* cited by examiner

CONFIGURABLE ASTRAGAL AND SNAP FEATURE FOR FENESTRATION SYSTEMS

RELATED APPLICATIONS

This application claims the benefit of priority under 35 U.S.C. § 119(e) of U.S. Provisional Patent Application No. 62/924,098, filed Oct. 21, 2019, and U.S. Provisional Patent Application No. 63/024,275, filed May 13, 2020, each of which is incorporated herein by reference.

BACKGROUND

Fenestration systems may include various types of panels, such as window panels and door panels. These panels can be installed into frames, and some are movable (e.g., sliding window or door panel relative to its frame, swinging window or door panel relative to its frame) while others are fixed (e.g., panel fixed to its frame so it cannot move relative to the frame). Fenestration systems can include an astragal installed between panels in a frame. Astragals can be used to seal between two adjacent panels and can also provide an attachment point for a movable door or window when it is in a closed position. However, fenestration systems having panels arranged in different configurations may require different types of astragals. For instance, in a fenestration system having a non-movable panel and an adjacent movable panel, one type of astragal may be required between the two panels. In a system having two adjacent non-movable panels, a different type of astragal may be required between the panels. And in systems having more than two panels, with certain panels non-movable and others movable, multiple different types of astragals may be required. Further, when it is desired that a panel be located in a different rail or plane, yet another type of astragal may be required.

The present inventors have recognized that requiring different types of astragals in fenestration systems can increase astragal manufacturing cost and add complexity to system installation. The present inventors have recognized the benefit of providing a configurable astragal that can be used in different fenestration systems having various panel arrangements.

DETAILED DESCRIPTION OF PREFERRED EMBODIMENTS

Figure 1:
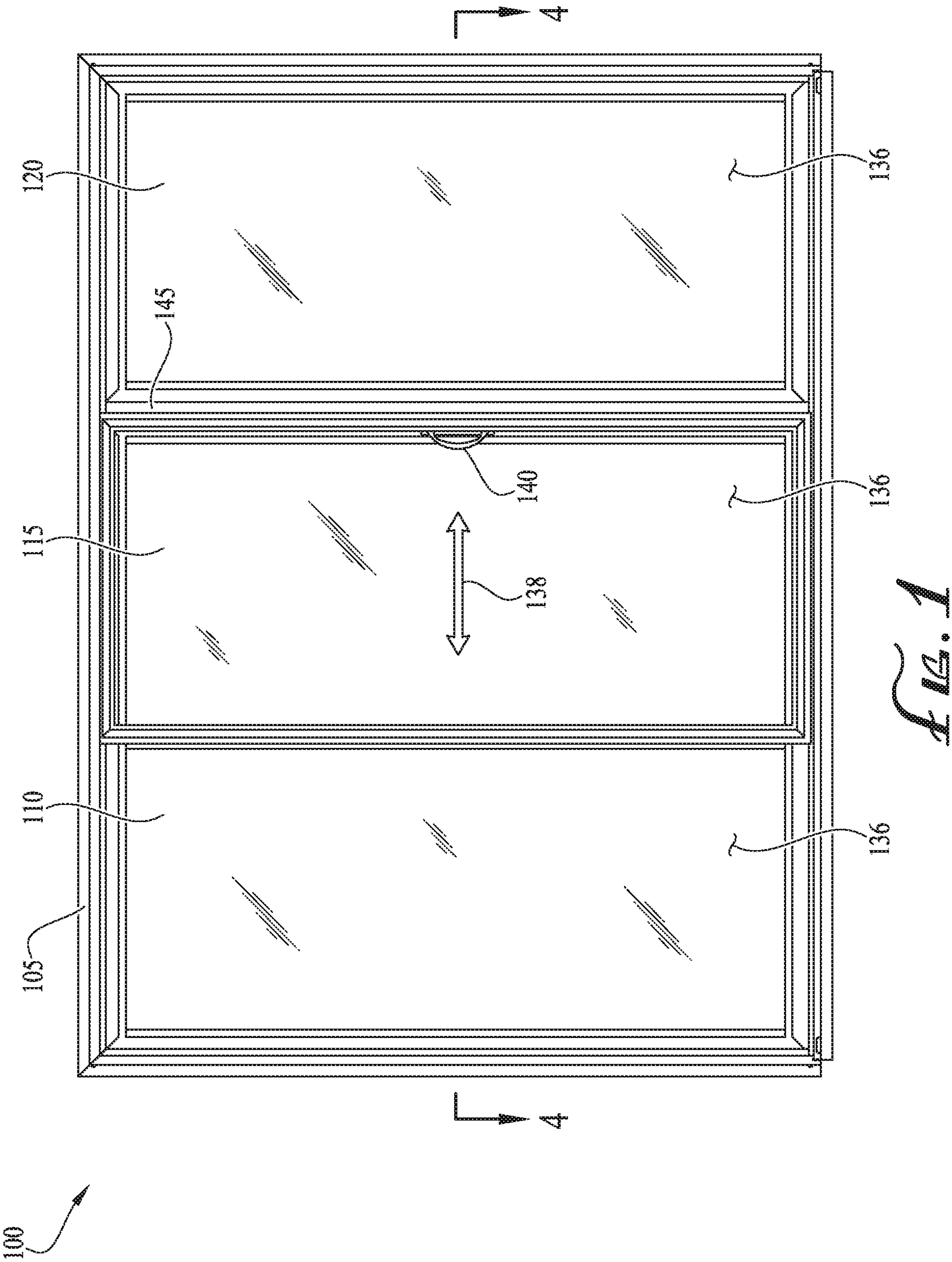
FIG. 1 is a front view of a sliding patio door system.
Figure 2:
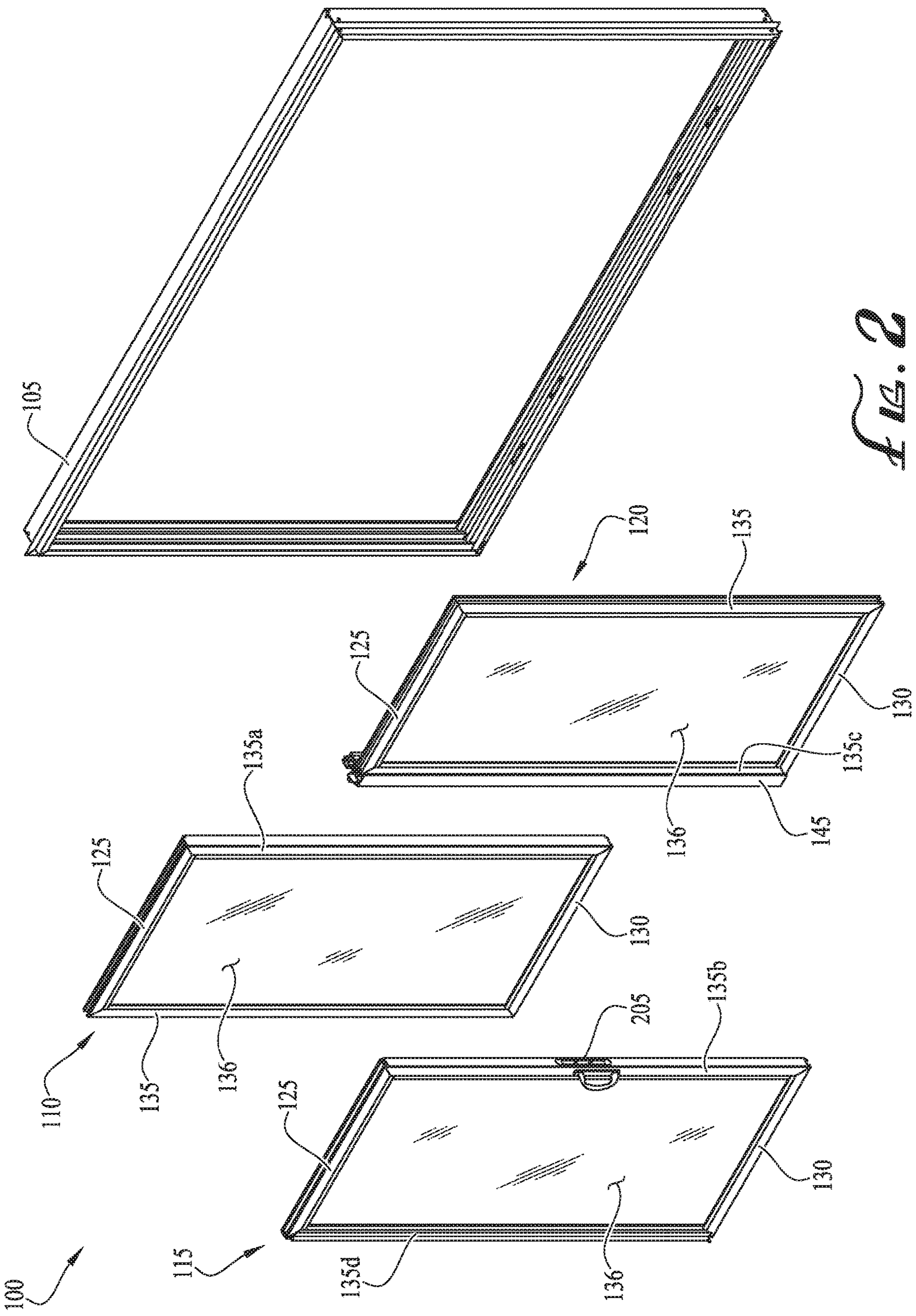
FIG. 2 is an isometric exploded view of the sliding patio door system of FIG. 1.

FIG. 1 Illustrates an embodiment of a fenestration system in the form of a sliding patio door system 100 in a closed position including components thereof. FIG. 2 is an exploded assembly view of sliding patio door system 100. Sliding patio door system 100 has an exemplary panel arrangement with which a configurable astragal of the present disclosure can be used. The configurable astragal, however, is also usable in other patio door systems having different panel arrangements, and FIGS. 14-18 show use of the astragal in some such other systems.

Figure 3:
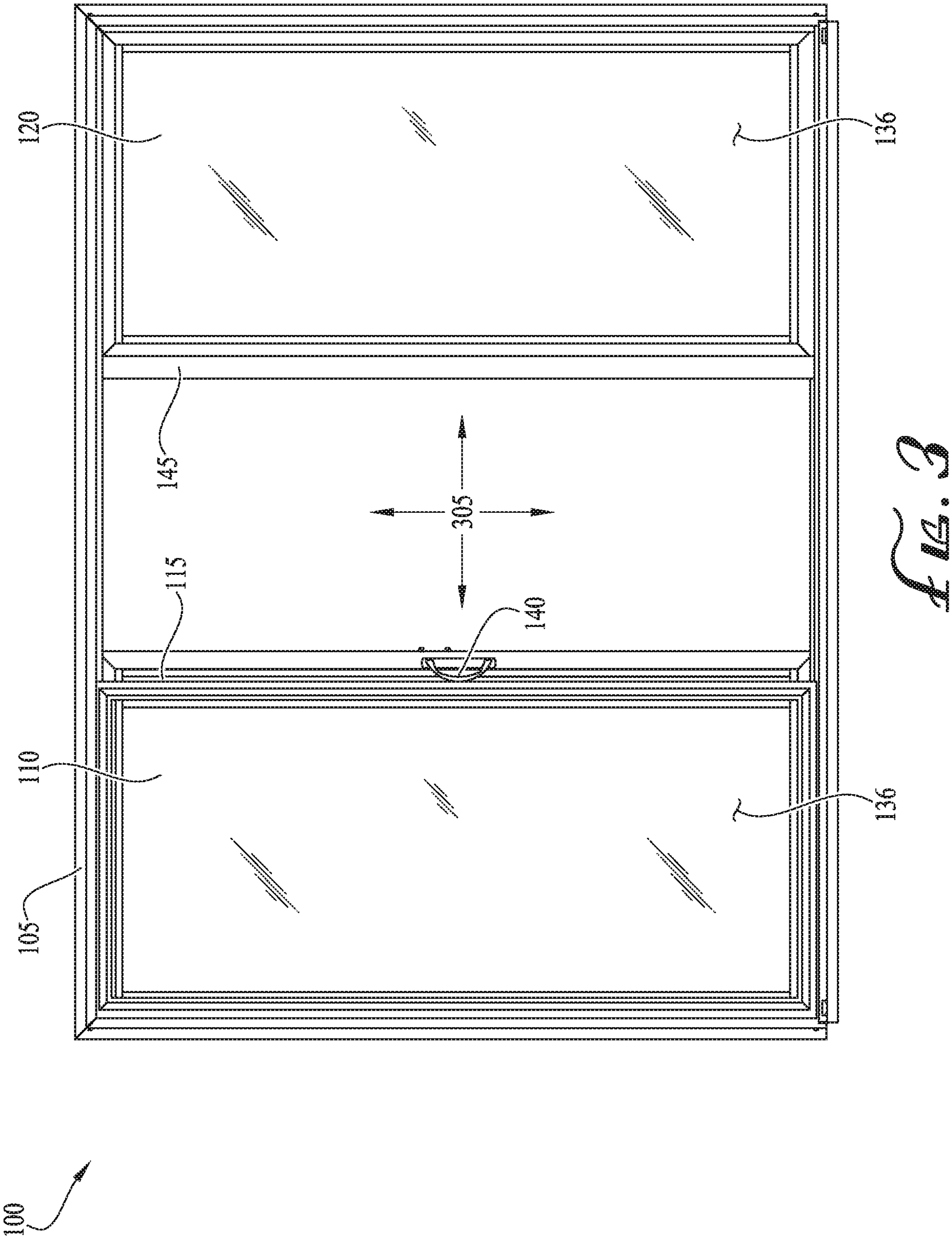
FIG. 3 is a front view of the sliding patio door system of FIG. 1, shown in an open position.

With reference to FIGS. 1 and 2, sliding patio door system 100 includes a frame 105 and a first panel 110, a second panel 115, and a third panel 120 disposed within frame 105. First panel 110, second panel 115, and third panel 120 each include a top rail 125, bottom rail 130, and stiles 135 (including stiles 135*a*, 135*b*, 135*c*, and 135*d*, shown in FIG. 2) framing a glass pane, insulated glazing unit, or other glazing pane 136. In the embodiment shown, second panel 115 is movable within frame 105 in a direction parallel to the frame 105 (shown by double headed arrow 138) and includes a handle 140. FIG. 3 is a front view of sliding patio door system 100 of FIG. 1, where second panel 115 is in an open position. In the embodiment shown, second panel 115 in the open position creates an opening 305 allowing entry to and exit from a building in which the door system 100 is installed. Handle 140 is used to grip the second panel 115 for sliding it between an open position illustrated in FIG. 3 and the closed position illustrated in FIG. 1.

In the embodiment shown in FIGS. 1-3, first panel 110 and third panel 120 are non-movable and fixed to frame 105. In other embodiments, one or more of first panel 110, second panel 115, and third panel 120 may be movable within frame 105 in a direction parallel to the frame 105 and each movable panel may include a handle to facilitate manual movement. In other embodiments (not illustrated), one or more of first panel 110, second panel 115, and third panel 120 may be pivotable about a hinge such that they swing away from the plane of frame 105 toward a plane perpendicular and/or acute and/or obtuse relative to frame 105. In other embodiments, additional panels (in addition to panels 110, 115, and 120) are included within frame 105. In other embodiments, only a subset (e.g., two) of panels 110, 115, and 120 are included within frame 105.

The embodiment of FIGS. 1-3 include an astragal 145 (best shown in FIG. 2) located between second panel 115 and third panel 120. Astragal 145 is configured to slidably receive an adjacent stile 135*b* of second panel 115 when second panel 115 is in the closed position. As shown in FIG. 2, second panel 115 includes a locking mechanism 205. For example, locking mechanism 205 may engage a lock keeper or catch 406 (FIG. 5) of astragal 145 when second panel 115 is in the closed position, to thereby lock the second panel 115 in the closed position. Astragal 145 is also configured to receive an adjacent stile 135*c* of third panel 120. In other embodiments (not illustrated), astragal 145 may be located between first panel 110 and second panel 115 and configured to receive an adjacent stile 135*a* of first panel 110 and an adjacent stile 135*d* second panel 115. In still other embodiments (not illustrated), a first astragal may be located between first panel 110 and second panel 115, configured to receive adjacent stiles 135*a* and 135*d* of respective first and second panels 110 and 115, and another astragal may be located between second panel 115 and third panel 120, configured to receive a adjacent stiles 135*b* and 135*c* of respective second and third panels 115 and 120. In some embodiments, a locking mechanism (e.g., locking mechanism 205) may be provided for second panel 115 that engages a lock keeper or catch of an astragal of first panel 110 when second panel 115 is in a closed position, to thereby lock the second panel 115 in the closed position.

In the embodiment shown, astragal 145 is permanently fastened to adjacent stile 135*c* of third panel 120 as further described below with reference to FIG. 5. However, in other embodiments astragal 145 is not permanently fastened to adjacent stile 135*c* of third panel 120. In other embodiments, astragal 145 may be permanently fastened to adjacent stile 135*b* of second panel 115 and adjacent stile 135*c* of third panel 120. Thus, an astragal of a single design can be used between adjacent panels of various configurations and uses (whether fixed or movable), and is configurable in various ways, as further described below.

Figure 4:
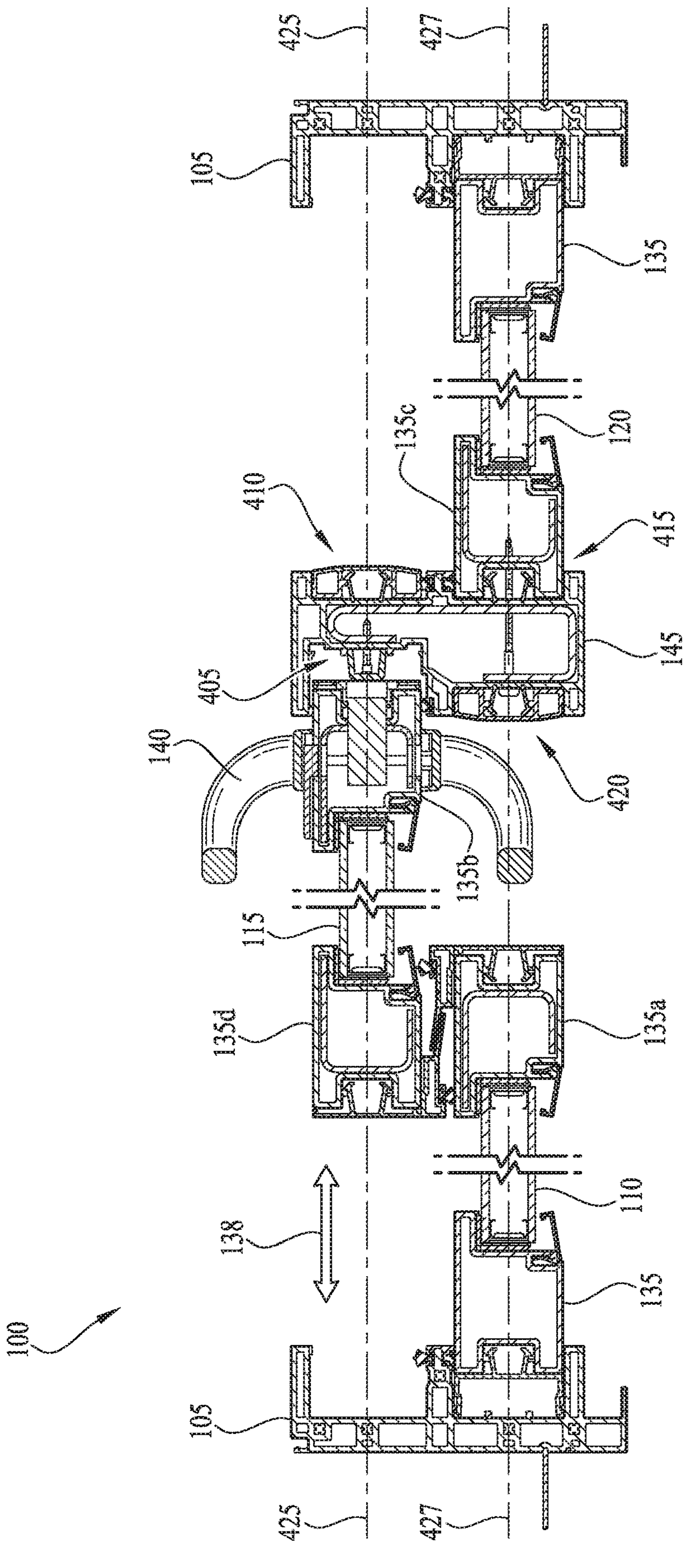
FIG. 4 is a cross section of the sliding patio door system of FIG. 1 taken along a section line 4-4 in FIG. 1.

FIG. 4 is a cross section of sliding patio door system 100 of FIG. 1 taken along a section line 4-4, showing panel 115 in the closed position. In the embodiment shown, astragal 145 includes four elongate slots 405, 410, 415, and 420 which extend perpendicular to the plane of the cross-section view. The slots 405, 410, 415, 420 run along a length of the astragal 145 in the vertical direction and have a length (height) corresponding to the height of panels 110, 115, 120. In the embodiment shown, slots 405 and 420 are located on a first astragal face, slots 410 and 415 are located on a second astragal face, and the first astragal face and second astragal face are on opposite sides of astragal 145. In the embodiment shown, slots 405 and 420 are adjacent to each other on the first astragal face and slots 410 and 415 are adjacent to each other on the second astragal face and directly opposite slots 405 and 420 respectively.

Each of slots 405, 410, 415, and 420 is configured to receive a stile or other portion of an adjacent panel. In the embodiment shown, astragal 145 has received an adjacent stile 135*b* of second panel 115 in slot 405 and an adjacent stile 135*c* of third panel 120 in slot 415. In the embodiment shown, second panel 115 is slidable in a plane 425 between the closed and open positions in directions toward and away from slot 405 as shown by double arrow 138. A plane 425 extending through frame 105 may be defined by guide slots or rail(s) (not shown) of frame 105 that guide the sliding movement of panel 115. Panels 110 and 120 are fixed within frame 105 and both located in a second plane 427 adjacent to and spaced apart from plane 425. Thus, slot 405 and slot 410 lie in plane 425, while slot 415 and slot 420 lie in second plane 427.

Embodiments of this disclosure contemplate astragal 145 having slots in addition to slots 405, 410, 415, and 420. For example, astragal 145 may include one or more additional slots adjacent to one or more of slots 405, 410, 415, and 420, and therefore may define one or more additional planes additional to planes 425 and 427. The one or more additional planes may be adjacent to plane 425 or plane 427, and spaced apart therefrom, for example. Embodiments of this disclosure also contemplate astragal 145 having fewer slots than four slots 405, 410, 415, and 420. For example, astragal 145 may include only a subset of slots 405, 410, 415, and 420, where the subset of slots can be in the same plane or different planes.

Figure 5:
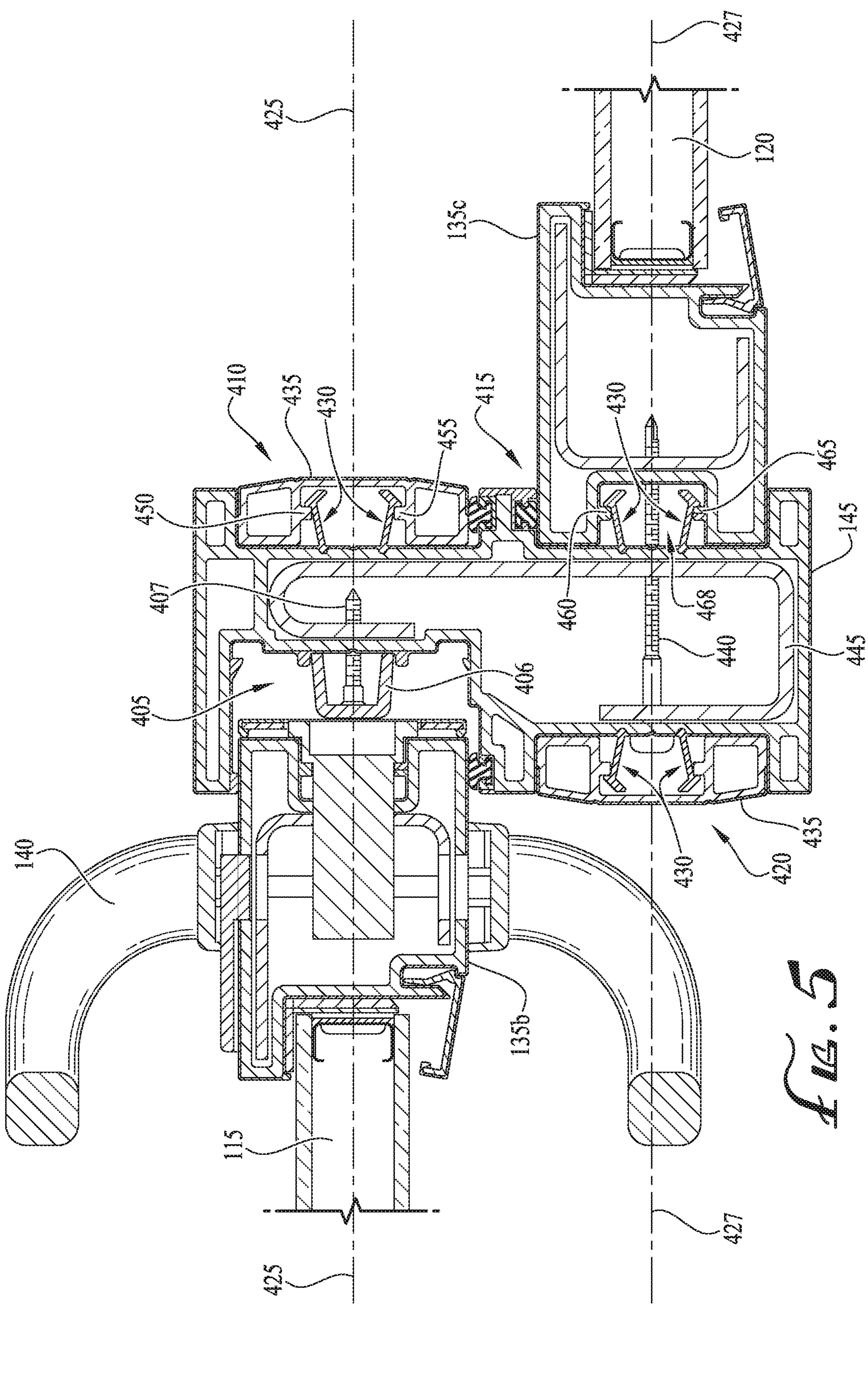
FIG. 5 is an enlarged detail view of the cross section of the sliding patio door system of FIG. 4 showing an astragal within the system.

FIG. 5 is an enlarged detail view of the cross section of the sliding patio door system of FIG. 4 showing astragal 145 with slots 405, 410, 415, and 420. In the embodiment shown, slot 405 has received an adjacent stile of panel 115 in the closed position and includes a lock catch 406 configured to lock panel 115 in the closed position when engaged by a latch (not shown) or other locking device of panel 115. In the embodiment shown, lock catch 406 is attached to astragal 145 by a screw 407. In the embodiment shown, slot 405 is a deep slot having side walls that extend further into astragal 145 relative to the side walls of slots 410, 415, and 420, which aids in securing a stile or other portion of an adjacent panel (second panel 115 in FIGS. 4 and 5) within slot 405, wherein the adjacent panel and/or astragal are movable relative to each other. Thus slot 405 is deeper than slots 410, 415, and 420. In other embodiments, a slot other than slot 405 is a deep slot. In other embodiments, the side walls of slots 405, 410, 415, and 420 extend the same distance into astragal 145, so that slots 405, 410, 415, and 420 have the same depth. In other embodiments, the side walls of two or more of slots 405, 410, 415, and 420 extend further into astragal 145 relative to the side walls of the other slots.

In the embodiment shown, slot 410 includes a snap clip 430. In some embodiments, slot 410 may be configured to receive an adjacent stile of a panel and snap clip 430 may be configured to attach to the stile in a similar manner as discussed with respect to slot 415 below. However, in the illustrated embodiment of FIG. 5, there is no panel received by slot 410, and slot 410 is covered by a cover 435. In the illustrated embodiment, cover 435 is secured by snap clip 430, which engages protrusions (e.g., ribs, ridges, or steps) 450 and 455 running longitudinally along the inner lateral sides of a mounting groove 470 (FIG. 10) of cover 435. For example, cover 435 is used to fill and obscure from view those astragal slots that are not attached to a panel and are otherwise not used. In some embodiments (not shown), a cover 435 (or alternatively, a different cover adapted to cover slot 405) may similarly be used to cover slot 405 when slot 405 is configured not to receive a panel.

In the embodiment shown, slot 415 is configured to receive panel 120 and includes a snap clip 430 configured to secure astragal 145 to an adjacent stile 135*c* of panel 120. In the illustrated embodiment of FIG. 5, astragal 145 is also secured to panel 120 via a screw 440 which penetrates the adjacent stile 135*c* of panel 120. Moreover, in the illustrated embodiment, adjacent stile 135*c* of panel 120 is secured by snap clip 430 that engages protrusions (e.g., ribs, ridges, or steps) 460 and 465 running longitudinally along the lateral inwardly-facing sides of a groove 468 in stile 135*c*. In another embodiment (not shown) the groove 468 may include channels running along the inwardly-facing sides of groove 468 instead of or in addition to bumps 460 and 465, and the snap clip 430 may engage the channels to retain stile 135*c* to astragal 145. In some embodiments, a cover 435 may be used to cover third slot 415, like as discussed above with respect to slot 410, when slot 415 is configured not to receive a panel.

In the embodiment shown, slot 420 also includes a snap clip 430. In some embodiments, slot 420 may be configured to receive an adjacent stile of a panel and snap clip 430 may be configured to attach to the stile in a similar manner as discussed above with respect to slots 410 and slot 415. However, in the illustrated embodiment of FIG. 5, there is no panel received by slot 420, and slot 420 is covered by a cover 435 in a similar manner as discussed above with respect to slot 410.

In the embodiment shown, astragal 145 includes a beam 445 inserted inside a cavity of astragal 145. Beam 445 increases structural integrity and stability of astragal 145 within frame 105. In the embodiment shown, beam 445 supports screws 407 and 440. Beam 445 is discussed further with respect to FIG. 9.

Figure 6:
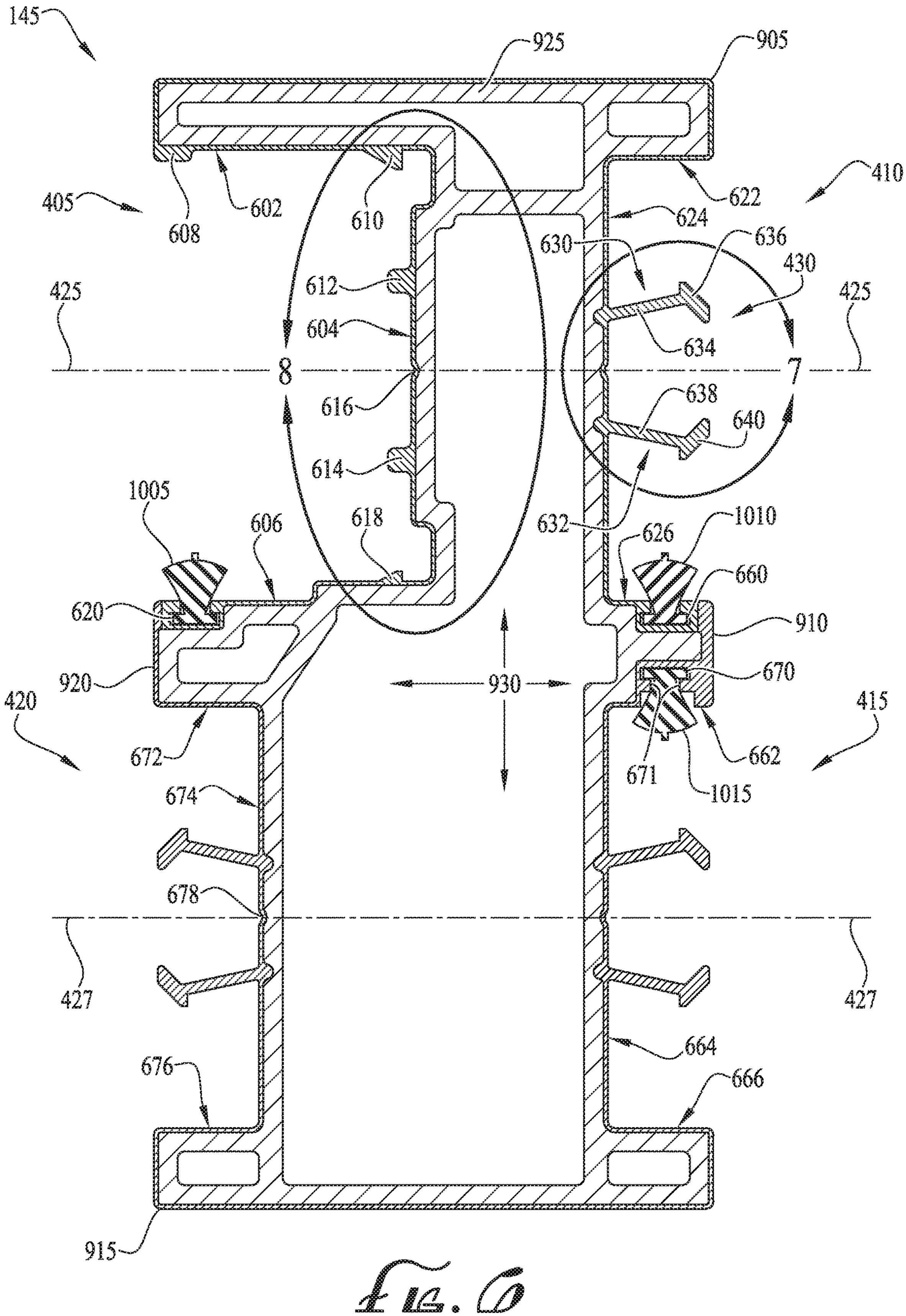
FIG. 6 is an enlarged cross-sectional view of the astragal part shown FIG. 5 without other components of the sliding patio door system.

FIG. 6 is an enlarged detail view of astragal 145 shown in the cross section of sliding patio door system 100 of FIG. 4, showing an enlarged view of slots 405, 410, 415, and 420 of astragal 145. In the embodiment shown, slots 405 and 410 are centered on a first plane 425, and slots 415 and 420 are centered on a second plane 427 spaced apart from first plane 425.

In the embodiment shown, slot 405 includes a side wall 602, floor 604, and side wall 606, where side walls 602 and 606 face each other within slot 405. In the embodiment shown, side wall 602 includes a bump 608 and a bump 610, where bump 610 extends further into slot 405 toward side wall 606 than bump 608, and side wall 606 includes a bump 618, where bump 618 extends further into slot 405 than bump 610. In the embodiment shown, floor 604 includes bumps 612 and 614 that are the same size and extend outward from slot 405, away from floor 605. In the embodiment shown, floor 604 also includes a hole 616 configured to receive a screw (e.g., screw 407) or other fastening device for attaching a component to floor 604. In the embodiment shown, bumps 608, 610, 612, 614, and 618 help guide and/or secure and/or align a stile of an adjacent panel within slot 405.

In other embodiments, one or more of bumps 608, 610, 612, 614, and 618 may be sized the same or have different sizes, and may extend further into slot 405 relative to other(s) of the bumps or may extend into slot 405 by the same amount. In other embodiments, one or more of bumps 608, 610, 612, 614, and 618 may have different shapes or may have the same shape. In some embodiments, one or more of bumps 608, 610, 612, 614, and 618 may be used to align and/or retain a cover (e.g., cover 435 or a different cover adapted to cover slot 405) in slot 405.

In the embodiment shown, slot 405 also includes weather strip channel 620. In some embodiments, weather strip channel 620 is sized to receive a weather strip inserted into it, which can provide a seal restricting air and particulate flow in the seam between an inserted stile 135 in slot 405 and side wall 606.

In the embodiment shown, slot 410 includes a side wall 622, floor 624, and side wall 626, where side walls 602 and 626 face each other within slot 410. Floor 624 of slot 410 and floor 616 of slot 405 face away from each other on astragal 145, and are located on opposite sides of astragal 145. Slots 405 and 410 are located in the same plane 425.

In some embodiments, floor 624 includes a hole configured to receive a screw or other fastening device. In the embodiment shown, floor 624 also includes snap clip 430. Snap clip 430 is comprised of a pair of flexible legs 630, 632 extending longitudinally along the floor 624 of the slot 410 and configured to receive and secure an edge of a panel stile 135. In the embodiment shown, snap clip 430 includes a first leg 630 and a second leg 632 that diverge from floor 624. First leg 630 includes an extension 634 and a ramp 636, and second leg 632 includes extension 638 and a ramp 640. In the embodiment shown, extensions 634 and 638 are attached to floor 624 and angle away from each other so as to diverge as they extend away from floor 624. In other embodiments, extensions 634 and 638 may be angled parallel to each other or toward each other. In the embodiment shown, ramps 636 and 640 are positioned on the free ends of their respective extensions 634 and 638. Further detail regarding snap clip 430 is discussed with respect to FIG. 7 below.

In the embodiment shown, side wall 626 includes weather strip channel 660. Like channel 620, weather strip channel 660 is sized to receive a weather strip inserted into it and can provide a seal restricting air and particulate flow in the seam between an inserted stile 135 in slot 410 and side wall 626.

In the embodiment shown, slot 415 includes a side wall 662, floor 664, and side wall 666, where side walls 662 and 666 face each other within slot 415. Floor 624 of slot 410 and floor 664 of slot 415 both face in the same direction and are arranged adjacent to each other on the same side of astragal 145. While slot 410 is located in plane 425, slot 415 is located in plane 427. In some embodiments, floor 664 includes a hole configured to receive a screw or other fastening device. In the embodiment shown, floor 664 also includes a snap clip 430. In the embodiment shown, side wall 662 includes weather strip channel 670. Weather strip channel 670 is sized to receive a weather strip inserted into it. However, in the embodiment shown, weather strip channel 670 includes ledges 671 that are located within the channel. In some embodiments, ledges 671 may be located at the same depth within channel 670, but in other embodiments they may be located at differing depths. Weather strip channel 670 can provide a seal restricting air and particulate flow in the seam between an inserted stile 135 in slot 415 and side wall 662.

In the embodiment shown, slot 420 includes a side wall 672, floor 674, and side wall 676, where side walls 672 and 676 face each other within slot 420. Floor 604 of slot 405 and floor 674 of slot 420 both face in the same direction and are arranged adjacent to each other on the same side of astragal 145. While slot 405 is located in plane 425, slot 420 is located in plane 427. Floor 664 of slot 415 and floor 674 of slot 420 face away from each other on astragal 145, and are located on opposite sides of astragal 145. Slots 415 and 420 are located in the same plane 427. In the embodiment shown, floor 674 includes a hole 678 configured to receive a screw or other fastening device. In the embodiment shown, floor 674 also includes a snap clip 430.

In the embodiment shown, an interior surface 905 is formed of a co-extruded polymer capstock material (co-extruded with the core 925) extending to cover slots 405, 410, and the portion of astragal 405 between channels 405 and 410. The capstock material of the interior surface 905 may be textured to resemble wood grain and may include additives to improve appearance, performance, and durability. In the embodiment shown, surface 905 is not exposed to an exterior environment. In the embodiment shown, exterior surfaces 910, 915, and 920 cover exterior-facing portions of astragal 145 other than surface 905 (i.e. facing an external environment outside of the building). In the embodiment shown, each of the exterior surfaces 910, 915, and 920 is formed of a co-extruded polymer capstock material and is exposed in sliding patio door system 100 to the exterior environment. The capstock material of exterior surfaces 910, 915, 920 may be colored or textured to resemble wood grain and may include UV stabilizers and other additives to enhance appearance, performance, and durability. In some embodiments, one or more of surfaces 905, 910, 915, and 920 are made from the same material, and in other embodiments surfaces 905, 910, 915, and 920 are made from different materials. In the embodiment shown, astragal 145 includes core material 925 forming the inner structure of astragal 145. Core material 925 is preferably a wood-polymer composite, such as an extruded wood-vinyl composite material formed of a cured mixture of wood flour or wood fiber and polyvinyl chloride (PVC) resin. Similarly, capstock materials for surfaces 905, 910, 915, 920 may be made of wood-vinyl composite, but having different additives and properties. For example, the capstock materials may be PVC or acrylic. A cavity 930 is formed within astragal 145, surrounded by core material 925.

The embodiment shown in FIG. 6 includes weather strips 1005, 1010, and 1015 installed in astragal 145. In the embodiment shown, weather strip channels 620, 660, and 670 have weather strips 1005, 1010, and 1015, respectively, installed within them.

Figure 7:
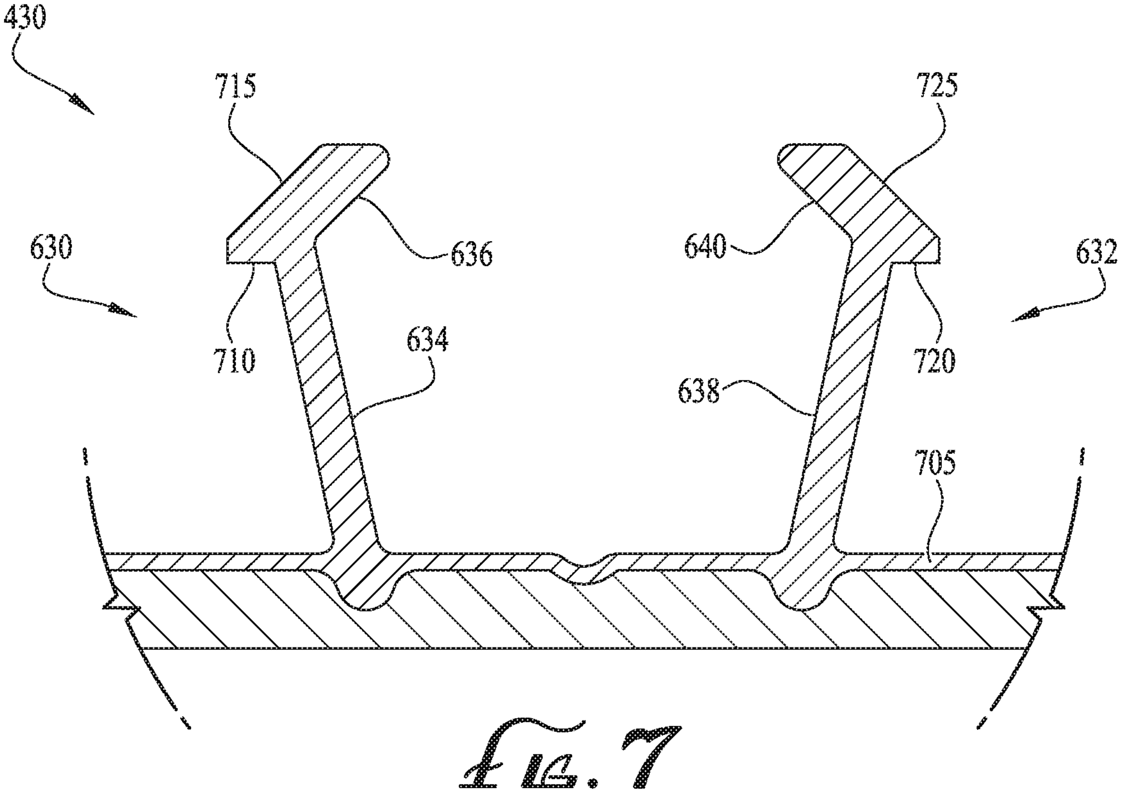
FIG. 7 is an enlarged detail view at 7-7 in FIG. 6 showing a snap clip of the astragal of FIG. 6.

FIG. 7 is an enlarged detail view of the snap clip 430 shown in the enlarged detail view of astragal 145 in FIG. 6. In the embodiment shown, snap clip 430 is attached to face 705. Face 705 can be floor 604, 624, 664, or 674, for example. As explained above, snap clip 430 includes a leg 630 and leg 632, where leg 630 includes extension 634 and ramp 636, and leg 632 includes extension 638 and ramp 640. In the embodiment shown, ramp 636 includes an overhang 710 and ramp 640 includes an overhang 720, and overhangs 710 and 720 are the same size. In other embodiments, overhangs 710 and 720 may have different sizes. Ramp 636 also includes a body 715 and ramp 640 includes a body 725.

Overhangs 710 and 720 hook onto ribs, ridges, or steps within a stile 135 or another attached member. For example, with reference to both FIG. 7 and FIG. 5, an adjacent stile 135*c* of third panel 120 is inserted into slot 415 having a snap clip 430. Insertion moves the stile 135*c* into slot 415 such that bumps 460 and 465 of stile 135*c* contact bodies 715 and 725 of ramps 636 and 640. This contact causes legs 630 and 632 to flexibly bow inward from their resting position as stile 135*c* is inserted into slot 415. Further insertion of stile 135*c* into slot 415 causes bumps 460 and 465 to advance past bodies 715 and 725 and overhangs 710 and 720, causing legs 630 and 632 bow back outward to their resting position and overhangs 710 and 720 to hook the bumps 460 and 465. At this point, bumps 460 and 465 are secured by overhangs 710 and 720 and stile 135*c* is engaged with snap clip 430.

Turning back to FIG. 7, in the embodiment shown, extensions 634 and 638 each form an angle relative to face 705. In some embodiments, the angles may be the same, but in other embodiments, the angles may be different. For example, the angles may be obtuse or acute. In some embodiments, each angle may be about 78 degrees, or for example between about 70 and 89 degrees. In some embodiments, each angle may be about a right angle and the extensions 634 and 638 may be approximately parallel.

Figure 7A:
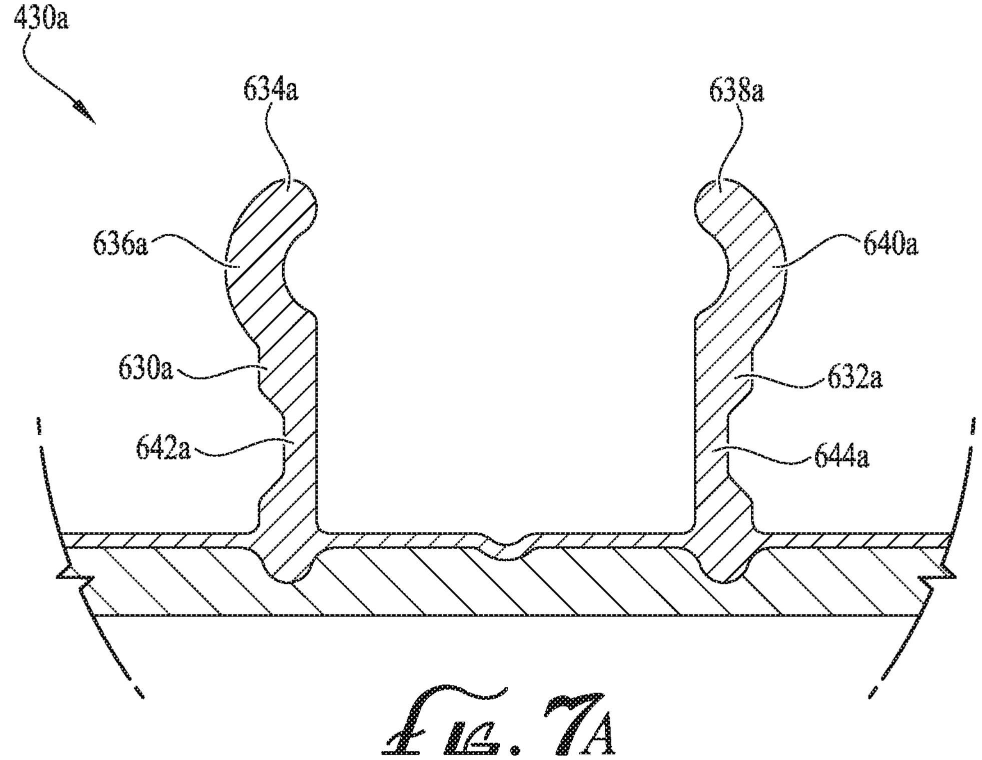
FIG. 7A is an enlarged detail view of an alternative snap clip for the astragal of FIG. 6.

FIG. 7A is a detail view of an alternative snap clip 430*a*. With reference to FIG. 7A, snap clip 430*a* includes a flexible first leg 630*a* and a flexible second leg 632*a*. First leg 630*a* is curved near its distal end 634*a* so as to form a ridge or protrusion 636*a* that projects outwardly away from second leg 632*a*. Similarly, second leg 632*a* is curved near its distal end 638*a* so as to form a ridge or protrusion 640*a* that projects outwardly away from first leg 630*a*. Distal ends 634*a* and 638*a* are recurved inwardly to provide a lead-in for facilitating smooth insertion of a stile into the slot, in a manner similar to the ramp 636 described above with reference to FIG. 7. In the embodiment illustrated, protrusions 636*a* and 640*a* are convex and bulbous or crowned, and smooth, but in other embodiments the protrusions 636*a* and 640*a* may be formed in another shape or configuration, such as a sharp ridge, barb, or undercut. Protrusions 636*a* and 640*a* engage ribs, ridges, or steps within a groove 468 (FIG. 5) of a stile 135 or another attached member. With reference to FIG. 7A and FIG. 5, insertion of stile 135*c* into slot 415 causes legs 630*a* and 632*a* to bend or flexibly bow inwardly as protrusions 636*a* and 640*a* ride over bumps 460 and 465 of stile 135*c*, then resiliently return to an outward position so that protrusions 636*a* and 640*a* engage bumps 460 and 465 and retain stile 135*c*. Legs 630*a* and 632*a* may include thinned sections 642*a* and 644*a* to tune the bending strength of legs 630*a* and 632*a*, respectively.

Figure 8:
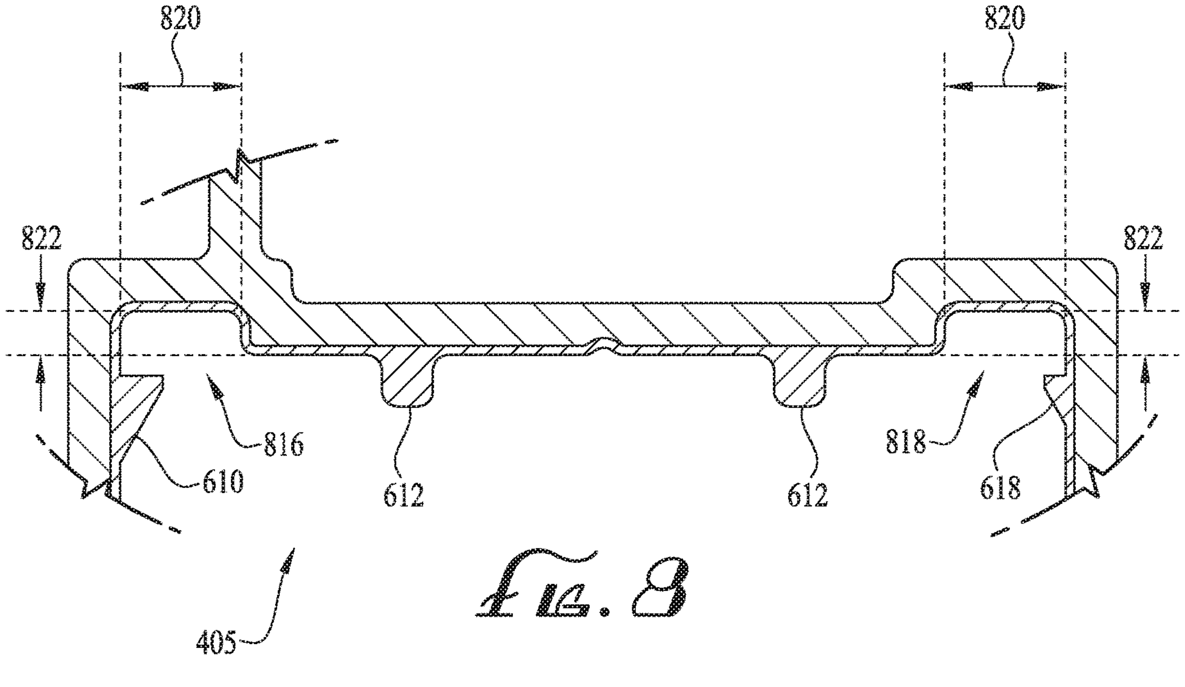
FIG. 8 is an enlarged detail view at 8-8 in FIG. 6 showing a slot of the astragal of FIG. 6.

FIG. 8 is an enlarged detail view of slot 405 at view 8-8 shown in FIG. 6. In the embodiment shown, as discussed previously, slot 405 includes bumps 610, 612, 614, and 618. In the embodiment shown, slot 405 includes notches 816 and 818 that are sized substantially the same, having substantially the same width 820 and depth 822. In other embodiments, notches 816 and 818 have different widths and/or depths.

Figure 9:
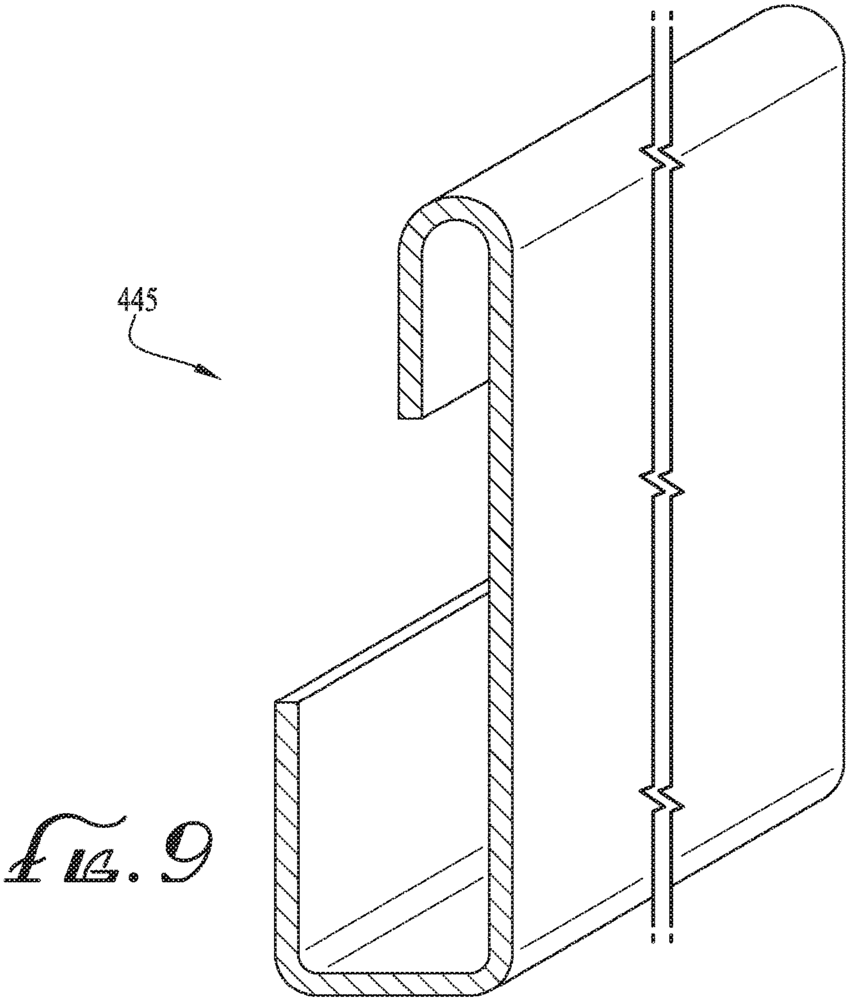
FIG. 9 is an enlarged detail view of a reinforcing beam of the astragal shown in FIG. 5.

FIG. 9 is an enlarged detail view of beam 445 of astragal 145 shown in FIG. 5. With reference to FIGS. 9 and 5, beam 445 is formed or shaped to fit inside a cavity 930 extending longitudinally through astragal 145. With reference to FIGS. 9 and 5, beam 445 is inserted within cavity 930 of astragal 145. In the embodiment shown in FIGS. 9 and 5, beam 445 is formed to substantially track and attach to part of the circumference of the inner surface of astragal 145 defined by cavity 930. In other embodiments, beam 445 is formed to substantially track and attach to the entire circumference of the inner surface of astragal 145 defined by cavity 930. For strength, beam 445 is preferably made from metal, such as galvanized mild steel.

Figure 10:
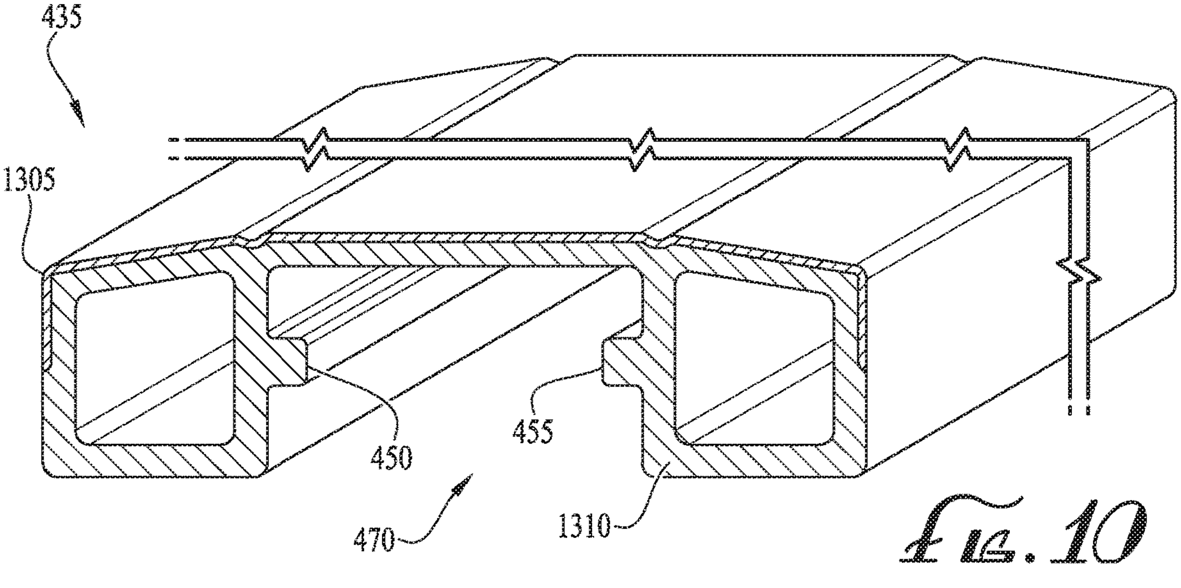
FIG. 10 is an enlarged detail view of a cover of the sliding patio door system of FIG. 4.

FIG. 10 is an enlarged detail view of cover 435 of sliding patio door system 100 of FIG. 4. In the illustrated embodiment, cover 435 includes bumps 450 and 455. For example, with reference to FIG. 10, FIG. 7, and FIG. 5, cover 435 is inserted into slot 410 having a snap clip 430. Insertion moves the bumps 450 and 455 into slot 410 such that bumps 450 and 455 contact bodies 715 and 725 of ramps 636 and 640 of snap clip 430. This contact causes legs 630 and 632 to flexibly bow inward from their resting position as cover 435 is inserted into slot 410. Further the insertion of cover 435 into slot 410 causes bumps 450 and 455 to advance past bodies 715 and 725 and overhangs 710 and 720, causing legs 630 and 632 bow back outward to their resting position and overhangs 710 and 720 to hook 450 and 455. Bumps 450 and 455 are secured by overhangs 710 and 720 and cover 435 is engaged with snap clip 430. While the example provided above is with reference to slot 410, it is applicable to other slots of astragal 145 having a snap clip 430. In the embodiment shown, cover 435 is made of an extruded material, which may include a co-extruded outer capstock surface 1305 made of a first material and a core 1310 is made of a second material. The capstock surface 1305 and core 1310 may be made from different materials or similar materials, such as from polyvinyl chloride (PVC), with the capstock surface 1305 optionally including additives for performance. Many other materials, resins, and composite material formulations may also be utilized.

Figure 11:
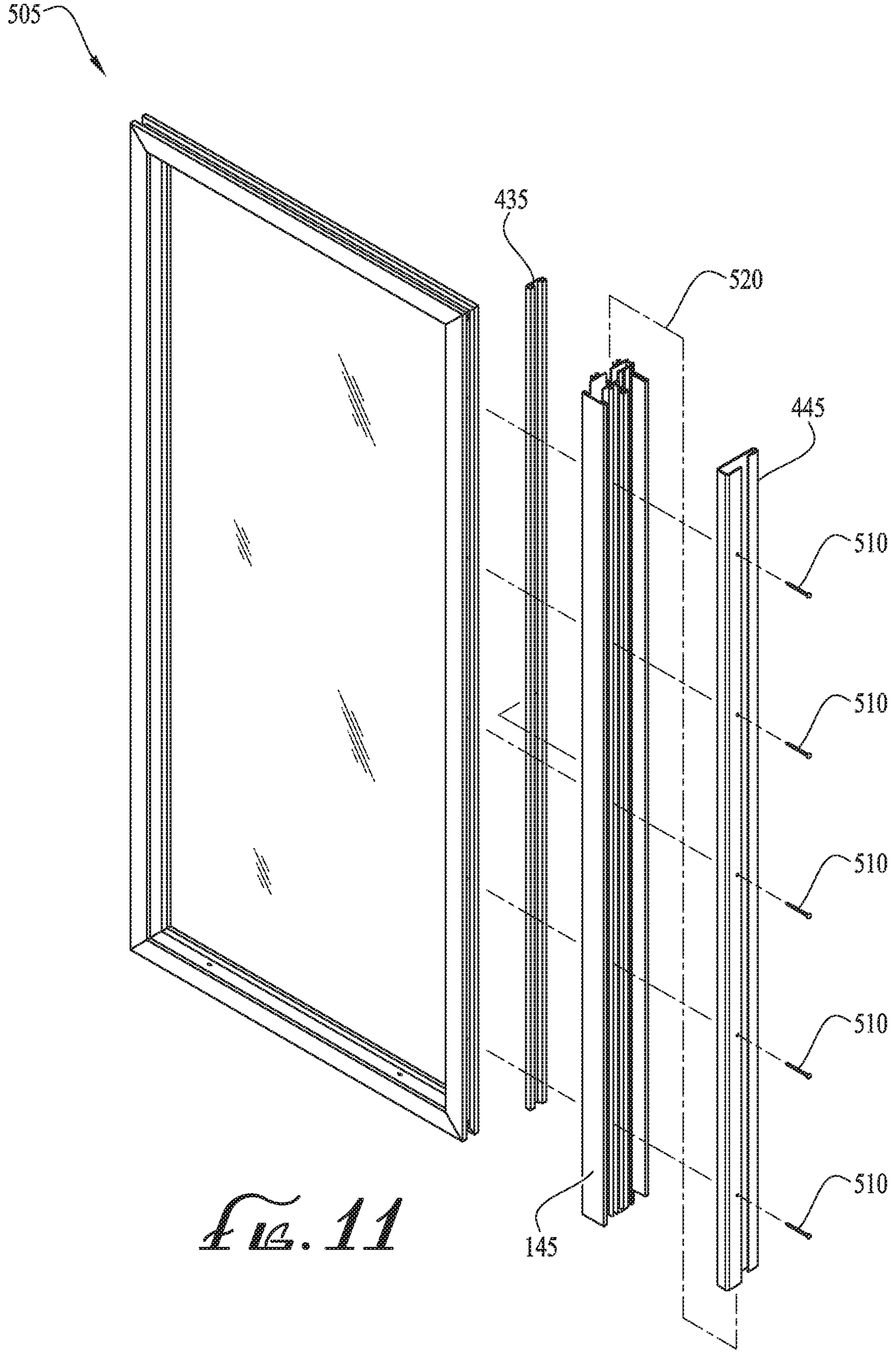
FIG. 11 is an isometric exploded view of exemplary panel subassembly of a sliding patio door system.
Figure 12:
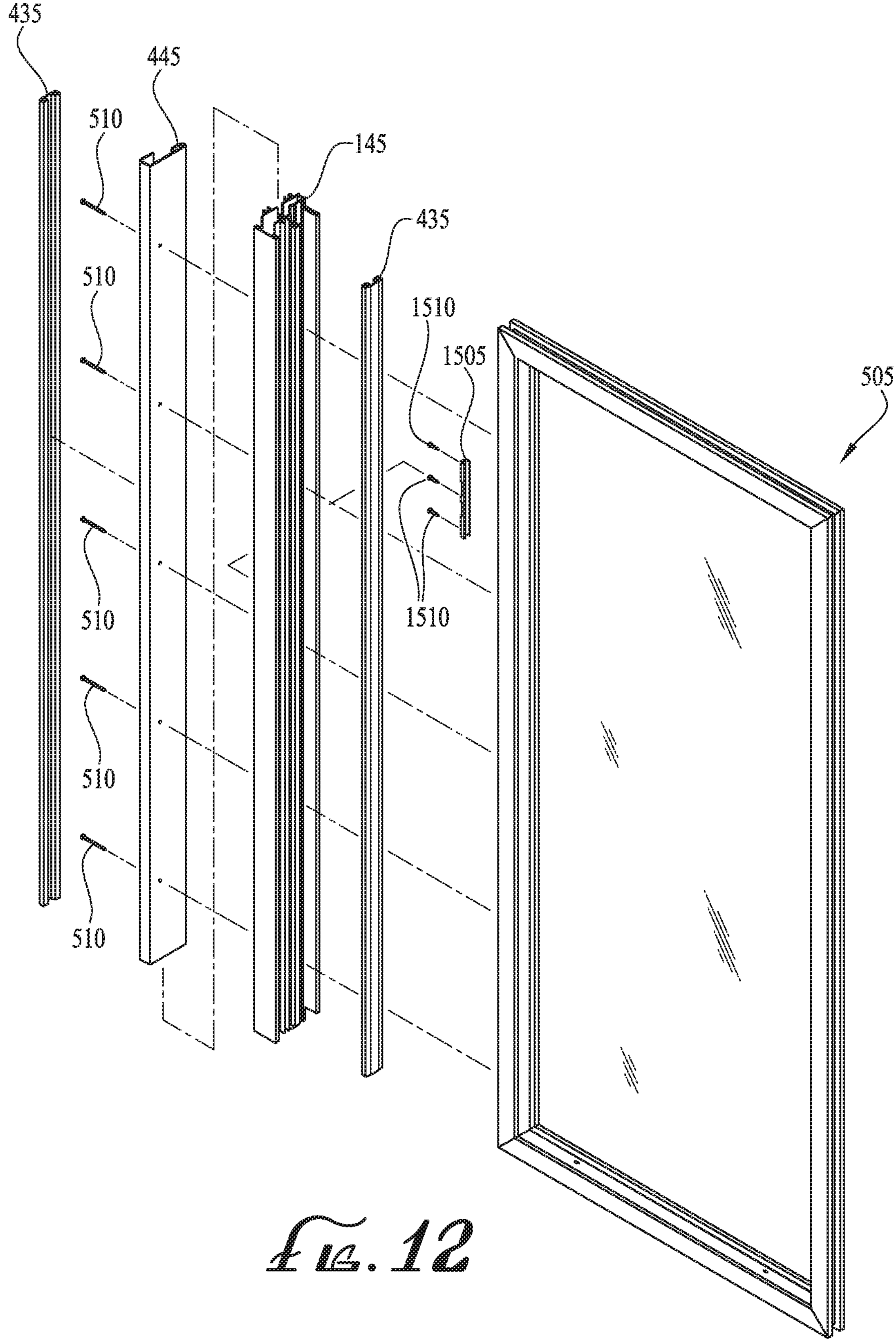
FIG. 12 is another isometric exploded view of exemplary panel subassembly of a sliding patio door system.
Figure 13:
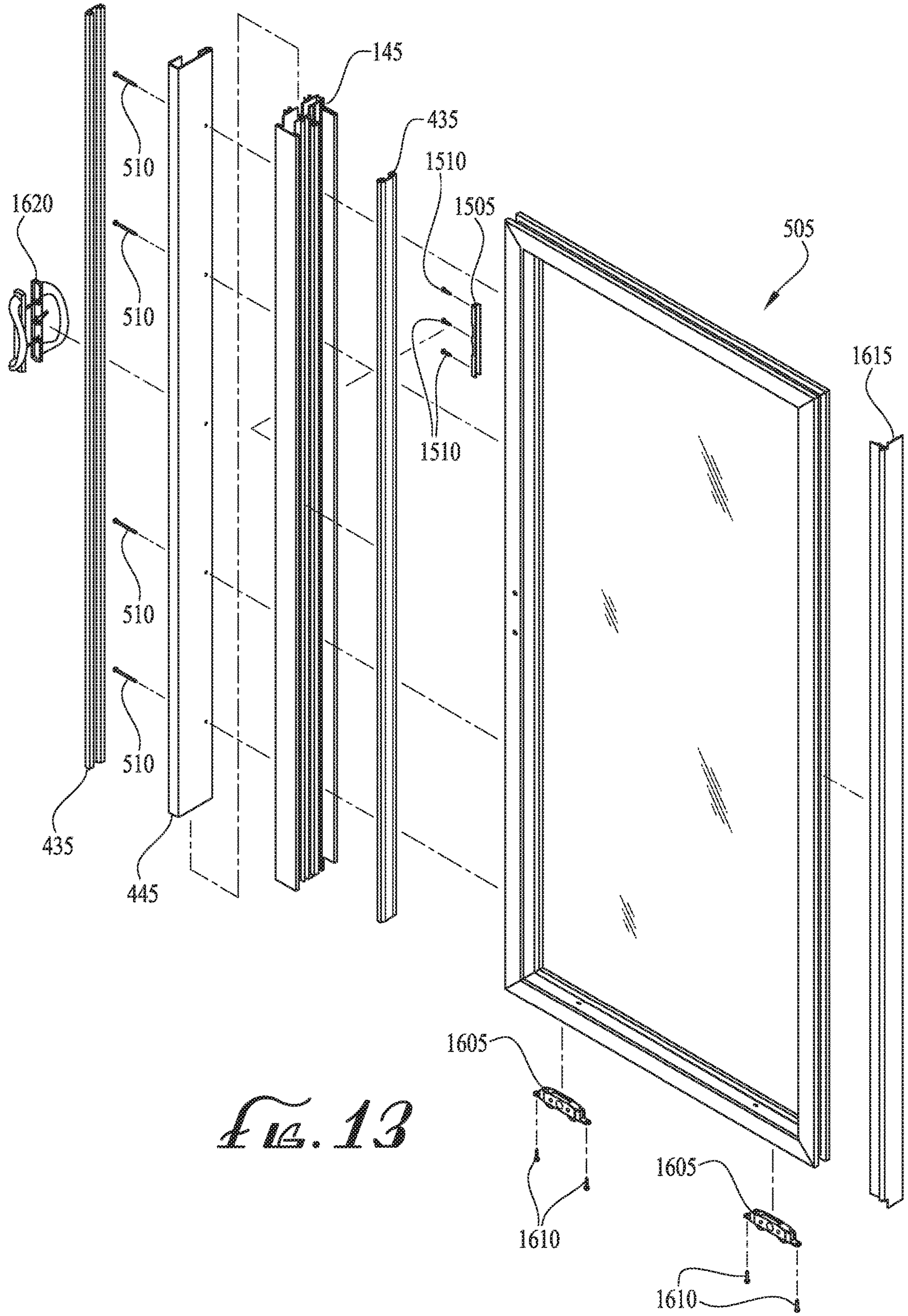
FIG. 13 is another isometric exploded view of exemplary panel subassembly of a sliding patio door system.

FIGS. 11, 12, and 13 show isometric exploded views of components attached to an exemplary panel 505 of a sliding patio door system. Panel 505 may be first panel 110, second panel 115, or third panel 120 of sliding patio door system 100 of FIG. 1, for example. In the embodiment shown, astragal 145 is attached to a stile 135 of panel 505 using one or more screws 510. In the embodiment shown, astragal 145 includes beam 445 inserted inside astragal 145 as reflected by line 520. In the embodiment shown, cover 435 is attached to a slot of astragal 145. With respect to FIG. 12, another arrangement including panel 505 is shown. In the embodiment shown, a lock keeper 1505 is attached to side stile 135 by one or more screws 1510. Lock keeper 1505 is configured to receive a lock hook or another locking mechanism to secure another panel to panel 505. With respect to FIG. 13, another arrangement including panel 505 is shown. In the embodiment shown, roller carriage assemblies 1605 are attached to panel 505 via screws 1610. In the embodiment shown, roller carriage assemblies 1605 are configured to ride on a track of a frame (such as frame 105) and facilitate low-friction movement of panel 505 in a direction parallel to the frame 105. In the embodiment shown, an interlock 1615 is attached to a stile 135 of panel 505. Interlock 1615 is configured to attach panel 505 to a frame (e.g., frame 105) when panel 505 is in an open position within the frame. In other embodiments, the components discussed with respect to FIGS. 11, 12, and 13 may be attached to another stile 135 of panel 505 different to the one shown having components attached in the FIGS. 11, 12, and 13.

As discussed, in some embodiments, slots 405, 410, 415, and 420 of astragal 145 are configured to engage an adjacent stile and can be covered when not in use. Thus, the configurability afforded by astragal 145 allows for its use in numerous different patio door systems having various panel arrangements. FIGS. 14-18 show further exemplary sliding patio door systems having various panel arrangements with which astragal 145 may be used.

Figure 14:
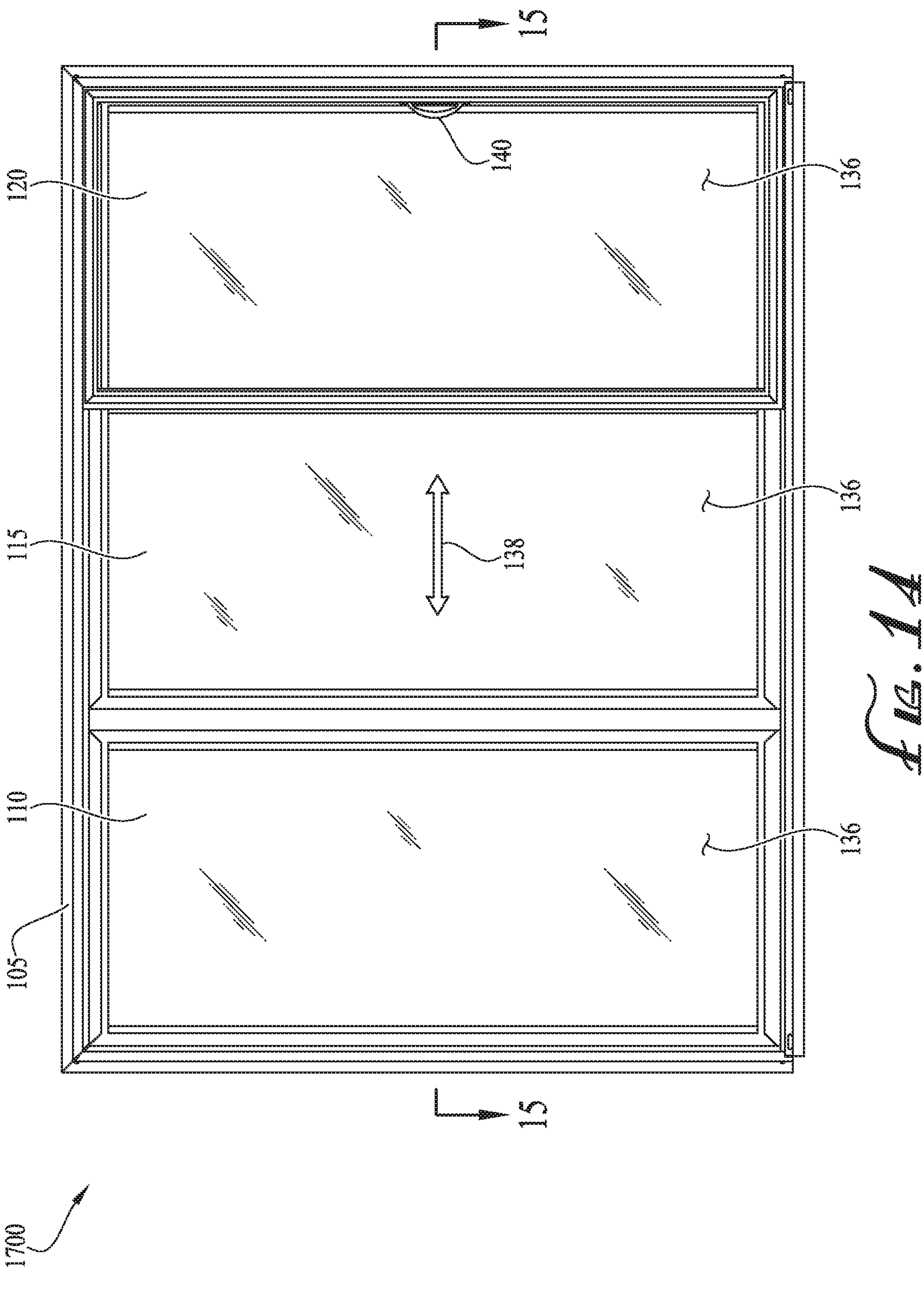
FIG. 14 is a front view of a sliding patio door system according to a second embodiment.

FIG. 14 is a front view of another sliding patio door system 1700. Sliding patio door system 1700 has another exemplary panel arrangement with which a configurable astragal of the present disclosure can be used. Like sliding patio door system 100, system 1700 includes three panels 110, 115, and 120. However, as distinguished from system 100, in the system 1700 shown in FIG. 14, second panel 115 is fixed to frame 105 and third panel 120 is movable within frame 105 in a direction parallel to the frame 105 (shown by double headed arrow 138). Handle 140 is mounted to third panel 120 to grip third panel 120 for sliding it between an open position and the closed position. In system 1700, first panel 110 and second panel 115 are non-movable and fixed to frame 105.

Figure 15:
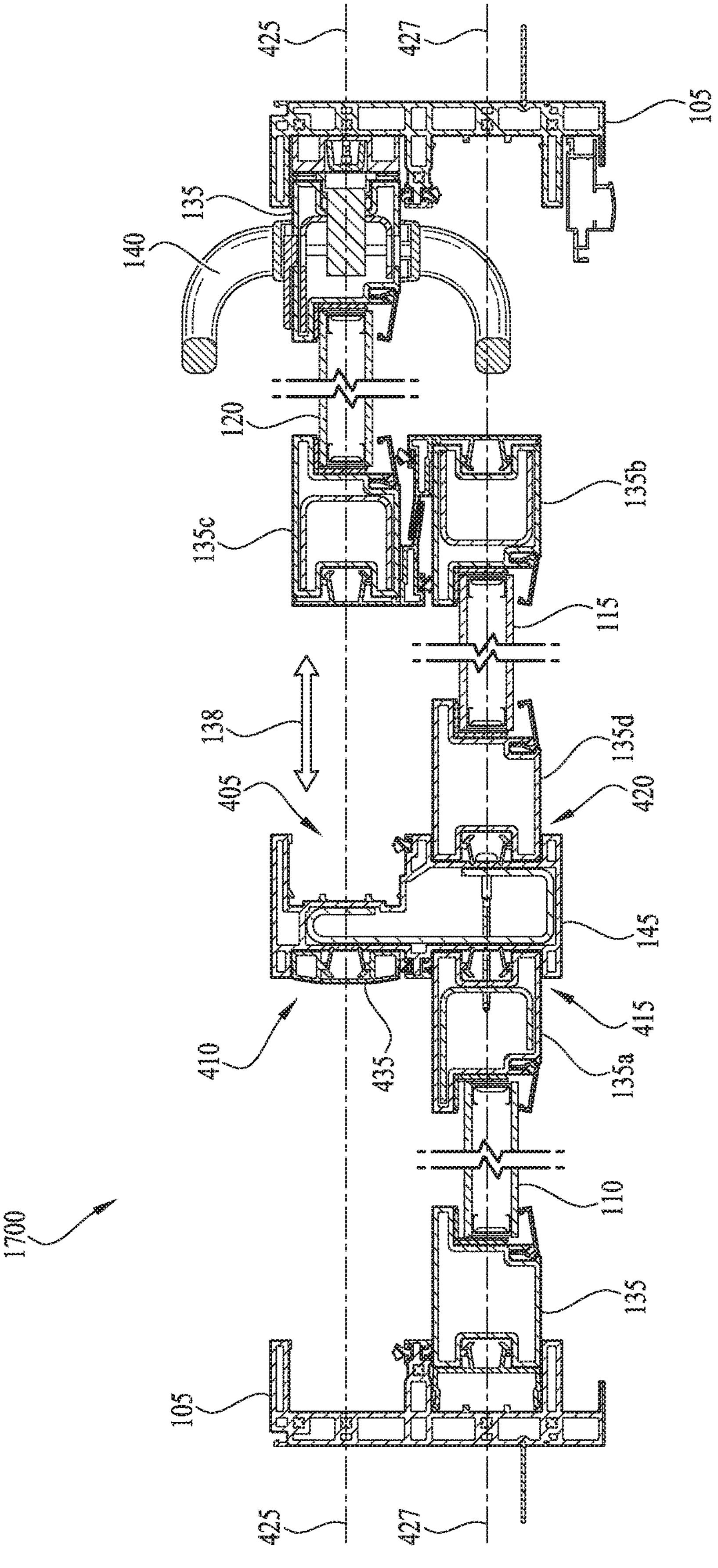
FIG. 15 is a cross section of the sliding patio door system of FIG. 14 taken along a section line 15-15 in FIG. 14.

FIG. 15 is a cross section of sliding patio door system 1700 of FIG. 14 taken along a section line 15-15, showing third panel 120 in the closed position. First and second panels 110 and 115 are both fixed within frame 105 in second plane 427 and are joined by astragal 145 positioned therebetween, with first and second panels 110 and 115 being received in respective slots 415 and 420. Third panel 120 is slidable in first plane 425 between the closed and open positions in directions away from and toward slot 405 of astragal 145 as shown by double arrow 1738. Note that astragal 145 of FIG. 15 is inverted relative to astragal 145 of FIGS. 1-5, so that slot 405 faces toward third panel 120. In the embodiment shown, slots 415 and 420 of astragal 145 have received adjacent stiles 135*a* and 135*d* of the respective first and second panels 110, 115, and slot 410 is covered by a cover 435. When third panel 120 is opened, slot 405 may provide clearance for stile 135*c*, allowing for third panel 120 to be opened to the full extent allowed by handle 140 (which may need to be flush, recessed, or omitted on the side of third panel 120 facing second panel 115, in order to accommodate a greater amount of opening movement).

Figure 16:
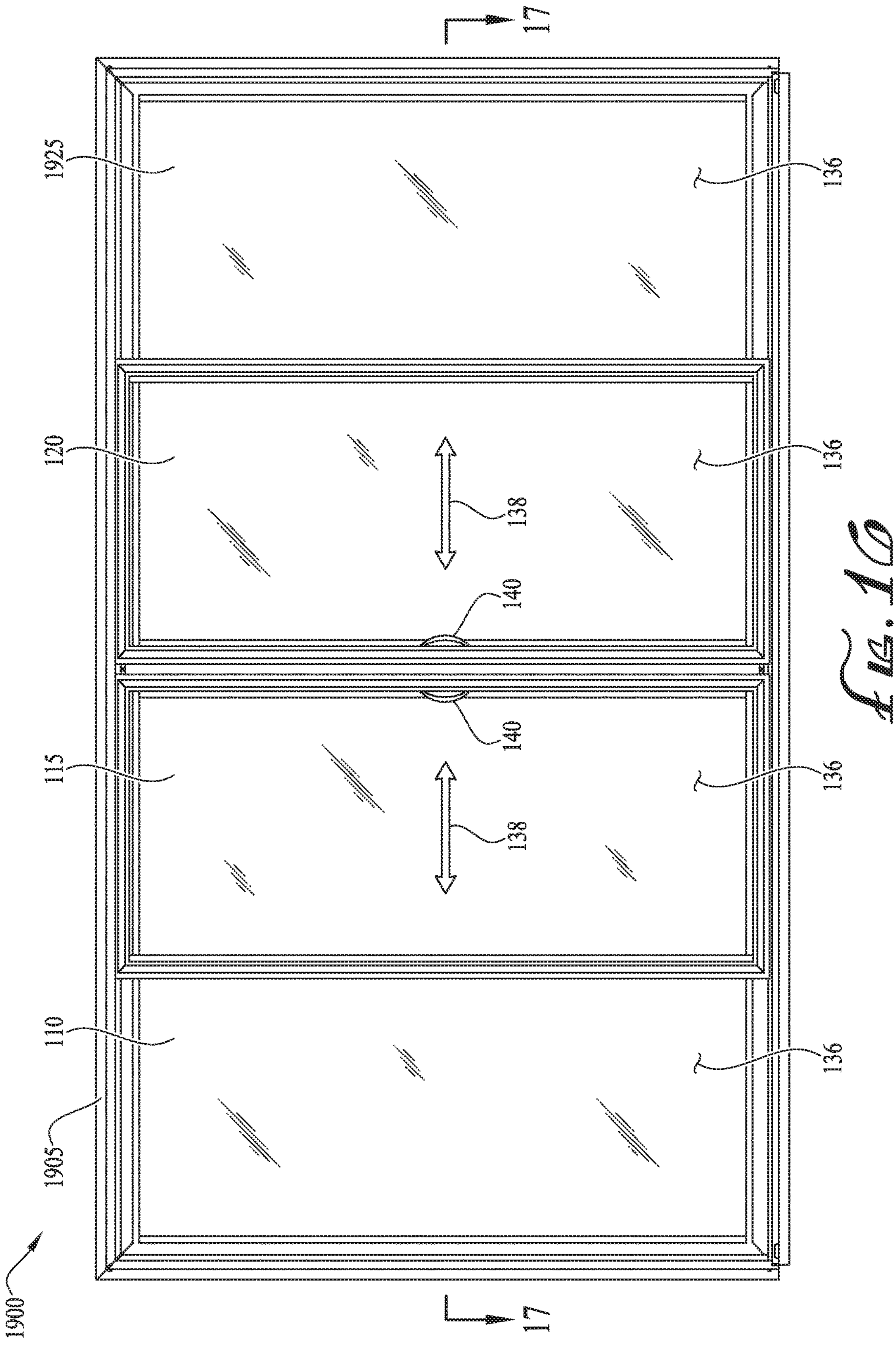
FIG. 16 is a front view of a sliding patio door system according to a third embodiment.

FIG. 16 is a front view of a sliding patio door system 1900, which shows yet another exemplary panel arrangement with which a configurable astragal of the present disclosure can be used. System 1900 includes four panels, including first panel 110, second panel 115, third panel 120, and fourth panel 1925. In system 1900, second panel 115 and third panel 120 lie in a common plane 425 (FIG. 17) and are movable within frame 1905 in a direction parallel to frame 1905 (shown by double headed arrow 138) and each includes a handle 140 for gripping and manual movement. In the embodiment shown, first panel 110 and fourth panel 1925 are non-movable and fixed to frame 1905.

Figure 17:
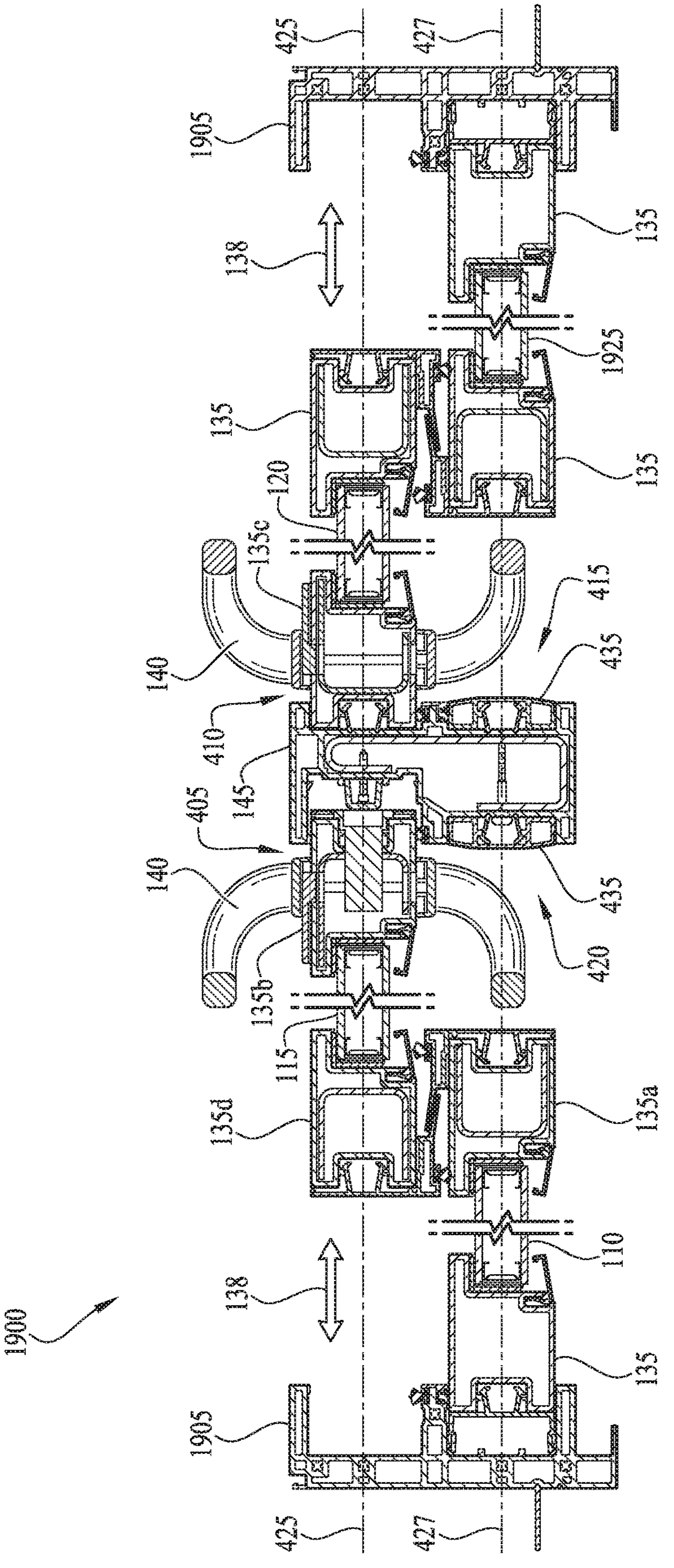
FIG. 17 is a cross section of the sliding patio door system of FIG. 16 taken along a section line 17-17 in FIG. 16.

FIG. 17 is a cross section of the sliding patio door system of FIG. 19 taken along a section line 17-17, showing third panel 120 and fourth panel 1925 in the closed position. In the embodiment shown, second panel 115 is slidable in plane 425 between the closed and open positions in directions away from and toward slot 405 of astragal 145 as shown by double arrow 138. In the embodiment shown, third panel 120 is slidable in plane 425 between the closed and open positions, as shown by double arrow 138. In some embodiments, second panel 115 and third panel 120 are individually slidable in plane 425 such that one may be slid open while the other remains in its closed position. In other embodiments, second panel 115 and third panel 120 are mechanically coupled to each other and geared for counteracting motion such that sliding one of the panels (115 or 120) toward its open position causes the other panel (120 or 115) to slide to its open position, and sliding one of the panels toward its closed position causes the other to slide toward its closed position. In the embodiment shown, third panel 120 has a stile 135*c* fixed to astragal 145 such that astragal 145 moves with third panel 120 when it is slid to various positions. In other embodiments, second panel 115 (rather than third panel 120) has a stile 135*b* fixed to astragal 145, such that astragal 145 moves with second panel 115 when it is slid to various positions. In other embodiments, second panel 115 and third panel 120 are not fixed to astragal 145, and astragal 145 is itself fixed within frame 1905. Here, when second panel 115 and/or third panel 120 are moved to the open position, astragal 145 remains fixed in frame 1905 between second panel 115 and third panel 120. In the embodiment shown, slots 420 and 415 of astragal 145 do not receive a panel and are covered by covers 435, and panels 110 and 1905 are fixed within frame 1905 and located in a plane 427 of frame 1905.

Figure 18:
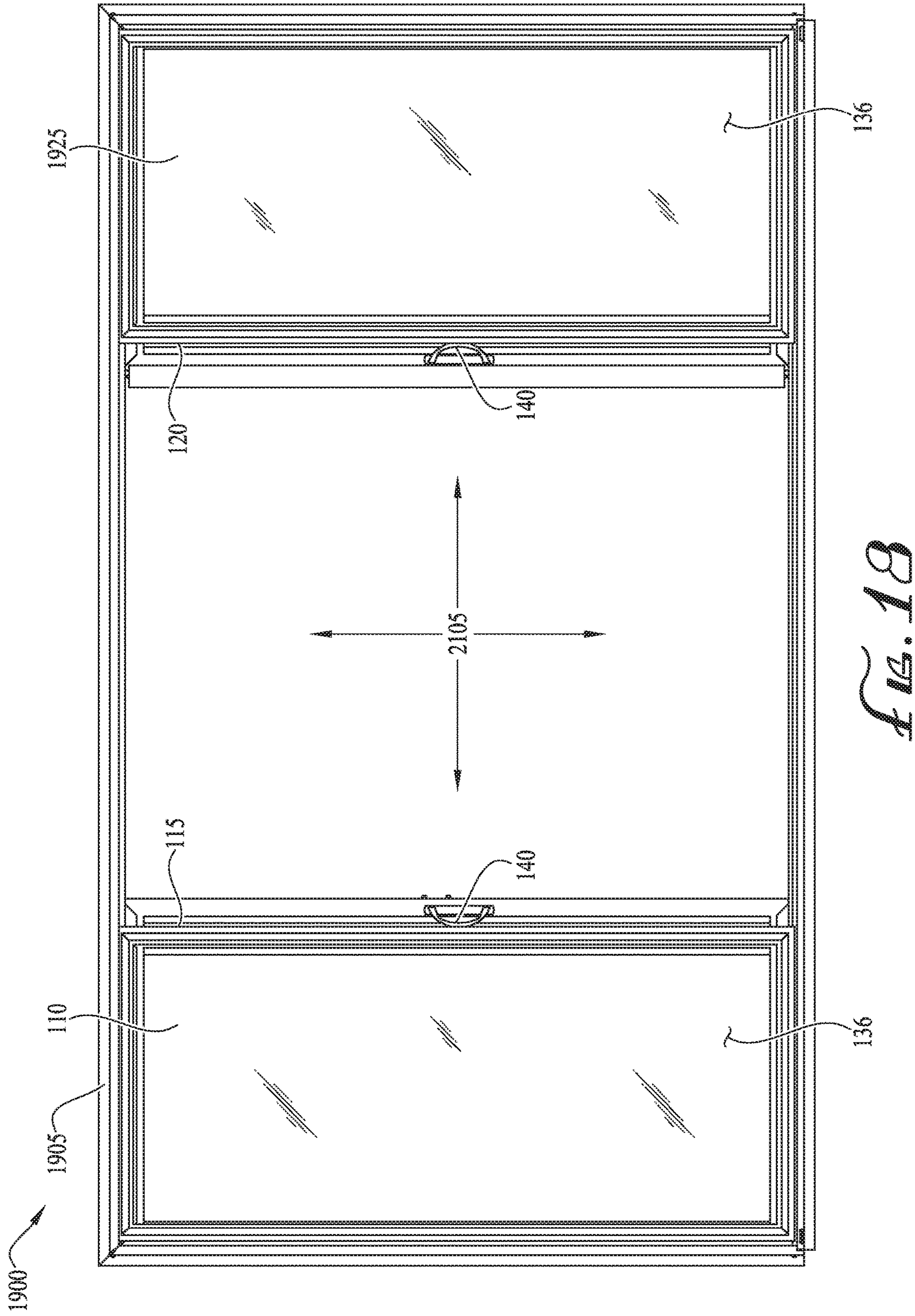
FIG. 18 is a front view of the sliding patio door system of FIG. 16, shown in an open position.

FIG. 18 is a front view of the sliding patio door system 1900 of FIG. 16, where second panel 115 and third panel 120 are each in an open position. In the embodiment shown, second panel 115 and third panel 120 in the open position creates an opening 2105.

It will be obvious to those having skill in the art that many changes may be made to the details of the above-described embodiments without departing from the underlying principles of the invention. The scope of the present invention should, therefore, be determined only by the following claims.

The invention claimed is:

1. A fenestration system comprising:

a frame;

a first panel slidably disposed within the frame and having a first stile, the first panel configured to slide along a sliding axis within the frame between a first position and a second position;

a second panel disposed within the frame and having a second stile; and an astragal disposed within the frame and disposed between the first panel and the second panel along the sliding axis, the astragal having a length running perpendicular to the sliding axis, the astragal having a first slot running along the length of the astragal, the first slot facing the first stile along the sliding axis and configured to removably receive the first stile as the first panel slides from the first position to the second position, the astragal further having a second slot running along the length of the astragal, the first and second slots facing in opposite directions along the sliding axis from opposite sides of the astragal, the second stile being positioned in the second slot and fixedly secured to the astragal;

wherein the first panel is moveable away from the astragal from the second position to the first position to form a first opening in the fenestration system;

the astragal including a snap clip within the second slot, the snap clip fixedly engaging the second stile to thereby secure the second panel to the astragal; and the second stile including a groove having inwardly-facing side walls which are contacted by the snap clip to secure the second panel to the astragal.

2. The fenestration system of claim 1, wherein the second panel is configured to move relative to the frame with the astragal attached to the second panel.

3. The fenestration system of claim 1, wherein the second panel is movable away from the first panel to enlarge the first opening of the fenestration system.

4. The fenestration system of claim 1, wherein the sliding axis, the first slot, the second slot, the first panel, and the second panel all lie in a common plane.

5. The fenestration system of claim 1, further comprising a third slot running along the length of the astragal, the third slot located adjacent to the second slot on the same side of the astragal as the second slot.

6. The fenestration system of claim 5, wherein the second slot has a depth that is equal to a depth of the third slot.

7. The fenestration system of claim 5, further comprising a fourth slot running along the length of the astragal, the fourth slot located on the same side of the astragal as the first slot.

8. The fenestration system of claim 7, further comprising at least one of:

a first cover positioned in the third slot and affixed to the astragal; and a second cover positioned in the fourth slot and affixed to the astragal.

9. The fenestration system of claim 1, further comprising a lock keeper located in the first slot.

10. The fenestration system of claim 1, wherein the first slot is deeper than the second slot.

11. A fenestration system comprising:

a frame;

a first panel disposed within the frame and having a first stile;

a second panel disposed within the frame and having a second stile; and an astragal disposed within the frame and having a length running vertically, the astragal having a first slot running along the length of the astragal, the first slot configured to slidably receive the first stile, the astragal further having a second slot running along the length of the astragal, the first and second slots located on opposite sides of the astragal, the second stile being positioned in the second slot and fixedly secured to the astragal;

wherein the first panel is moveable away from the astragal to form a first opening in the fenestration system;

wherein the astragal further includes a snap clip within the second slot, the snap clip fixedly engaging the second stile to thereby secure the second panel to the astragal; and wherein the second stile includes a groove running along a height of the second stile, the groove having inwardly-facing side walls which are contacted by the snap clip to secure the second panel to the astragal.

12. The fenestration system of claim 11, wherein the second panel is configured to move relative to the frame with the astragal attached to the second panel.

13. The fenestration system of claim 11, wherein the second panel is movable away from the first panel to enlarge the first opening of the fenestration system.

14. The fenestration system of claim 11, wherein the first panel is supported for sliding movement within the frame along a sliding axis toward and away from the astragal, and wherein the sliding axis, the first slot, the second slot, the first panel, and the second panel all lie in a common plane.

15. The fenestration system of claim 11, further comprising a third slot running along the length of the astragal, the third slot located adjacent to the second slot on the same side of the astragal as the second slot.

16. The fenestration system of claim 15, further comprising a fourth slot running along the length of the astragal, the fourth slot located on the same side of the astragal as the first slot.

17. The fenestration system of claim 16, further comprising at least one of:

a first cover positioned in the third slot and affixed to the astragal; and a second cover positioned in the fourth slot and affixed to the astragal.

18. The fenestration system of claim 15, wherein the second slot has a depth that is equal to a depth of the third slot.

19. The fenestration system of claim 11, further comprising a lock keeper located in the first slot.

20. The fenestration system of claim 11, wherein the first slot is deeper than the second slot.

* * * * *